July 19, 1966    R. W. PINNES    3,261,571
HIGH ALTITUDE AIRCRAFT
Filed Nov. 20, 1961    4 Sheets-Sheet 1

INVENTOR
ROBERT W. PINNES

BY
ATTORNEYS

July 19, 1966 R. W. PINNES 3,261,571
HIGH ALTITUDE AIRCRAFT
Filed Nov. 20, 1961
4 Sheets-Sheet 2

United States Patent Office 3,261,571
Patented July 19, 1966

3,261,571
HIGH ALTITUDE AIRCRAFT
Robert W. Pinnes, Rockville, Md., assignor to the United States of America as represented by the Secretary of the Navy
Filed Nov. 20, 1961, Ser. No. 153,767
3 Claims. (Cl. 244—1)

The invention described herein may be manufactured and used by or for the Government of the United States of America for governmental purposes without the payment of any royalties thereon or therefor.

This invention relates to an aircraft capable of high altitude flight, and more particularly to an aircraft capable of satellite operation.

It has, generally, been considered that the most advantageous manner of manned high altitude, sub orbital, or orbital flights would require an aircraft similar in operation with present-day jet aircraft. That is, an aircraft capable of employing runways for horizontal take-off and then, through various propulsion means, being capable of flying into orbit, would provide the most advantageous manned flights.

Jet aircraft thrust is presently accomplished by turbojet or ramjet operation. The basic difference between these propulsion methods is that the turbojet generally requires a compressor while the ramjet does not. Ramjets, however, are generally required to be set in motion by other means. A third classification of propulsion is rocket propulsion which operates substantially similarly as a ramjet but is fueled solely by rocket fuel rather than employing the elements present in the atmosphere. Rocket propulsion has, however, the great disadvantage of the rapid consumption of its fuel thereby depleting its fuel supply prior to leaving the earth's atmosphere.

The present invention utilizes rocket propulsion, by liquid air cycle engine operation, to initiate motion until ramjet propulsion is more advantageous whereupon the engines are converted to ramjet operation. After the aircraft reaches such a high altitude that the air becomes so thin as to hamper ramjet operation the engines are converted to rocket operation and the entire propellant is supplied to the engines from supply chambers within the aircraft. In this manner the atmosphere is employed to enhance high altitude flights thereby conserving the major portion of the rocket propellant for use at altitudes where conventional engines are not practical.

Since the density of liquid hydrogen for rocket fuel is such as to require large storage areas to store sufficient rocket fuel for a significant duration of rocket thrust, the instant invention sets forth the use of the fuel storage compartments as being the major portion of the airframe which has aerodynamic characteristics satisfactory to satisfy temperature and lift to drag ratio considerations. Of course, the necessary compartmental storage space, preferably close to the center of gravity of the aircraft, for the liquid oxygen required for rocket propulsion, is a part of the overall airframe. Liquid oxygen is of such a density, however, as to require much less storage area than the liquid hydrogen.

It has also been long considered that the most desirable type of booster for orbital or space vehicles is an aircraft. Thus, the immediate invention could be employed either as a booster or as an aircraft capable of flying all the way into orbit. When employed for booster purposes the instant invention would carry its pay load to the fringe of orbital altitude and velocity whereon its pay load, which could also be manned, would employ only rocket power for further flight. This pay load could also, however, employ conventional propulsion means in addition to its rocket propulsion as would enable selectively controlled flight upon re-entry into the earth's atmosphere.

The general purpose, therefore, of this invention is to disclose a vehicle which can fly into orbit. That is, the vehicle is controllable at all times like conventional aircraft. Eventually, however, it will reach a sufficient velocity and altitude to become a satellite and subsequently when it is desired to terminate the mission, the vehicle will fly down under full control at all times. In addition, if necessary, the mission may be aborted at any time, and the vehicle flown safely and controllably back to base. Thus, the invention comprises a vehicle capable of flying straight and level at all altitudes and speeds required between static sea level and orbiting speed and altitude.

At present, vehicles are placed into orbit by the use of rocket power. This is essentially a sling-shot approach whereby a velocity is developed relatively rapidly by rocket thrust. The vehicle is then pointed in the right direction, and additional velocity is developed, again by rocket power, to place the vehicle in orbit. The primary disadvantage of this method is the lack of control during flight. The process is essentially irreversable, and once committed, must continue to success or failure. This is especially a serious feature for manned flights. In addition, even for a successful orbit, the problem of re-entry is a highly serious one, due primarily to the lack of control which the pilot has on the vehicle.

Accordingly, it is an object of the present invention to provide an aircraft capable of operation as a booster of a pay load to the fringes of orbital altitudes and velocities.

Another object is to provide an aircraft capable of flying into orbit.

A further object of the invention is the provision of an aircraft capable of flying into orbit and flying out of orbit at the pilot's discretion.

Still another object is to provide a manned aircraft capable of straight and level flight into and out of orbit under full control of the pilot thereof.

Yet another object of the present invention is the provision of a manned aircraft employing the fuel container as its main aerodynamic surface which is capable of straight and level take-off, flight into orbit, re-entry, and landing while under the full control of its crew.

A still further object is an aircraft capable of straight and level flight from the earth and into orbit at all altitudes and speeds required between static sea-level and orbiting speed and altitude.

A further object is an aircraft capable of storing sufficient liquid hydrogen and liquid oxygen for sustained flight into orbit by rocket propulsion initiated at an altitude where ramjet operation is impractical.

Yet a still further object is the provision of an airframe and a propulsion system combination in which many of the advantages of the ramjet, and rocket types of propulsion have been so combined that the airplane can be started in flight as a rocket and then converted to a ramjet and finally again into a rocket.

Other objects and many of the attendant advantages of this invention will be readily appreciated as the same becomes better understood by reference to the following detailed description when considered in connection with the accompanying drawings wherein.

Figure 1:
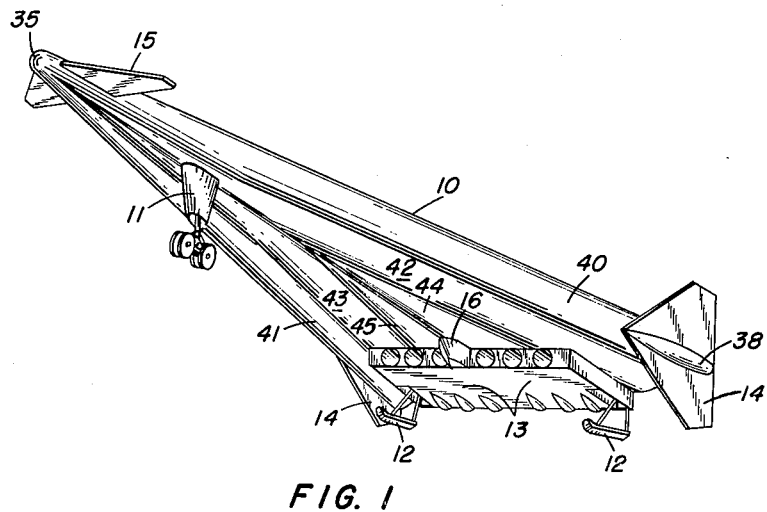
FIG. 1 is a perspective view of an embodiment of the invention.
Figure 4:
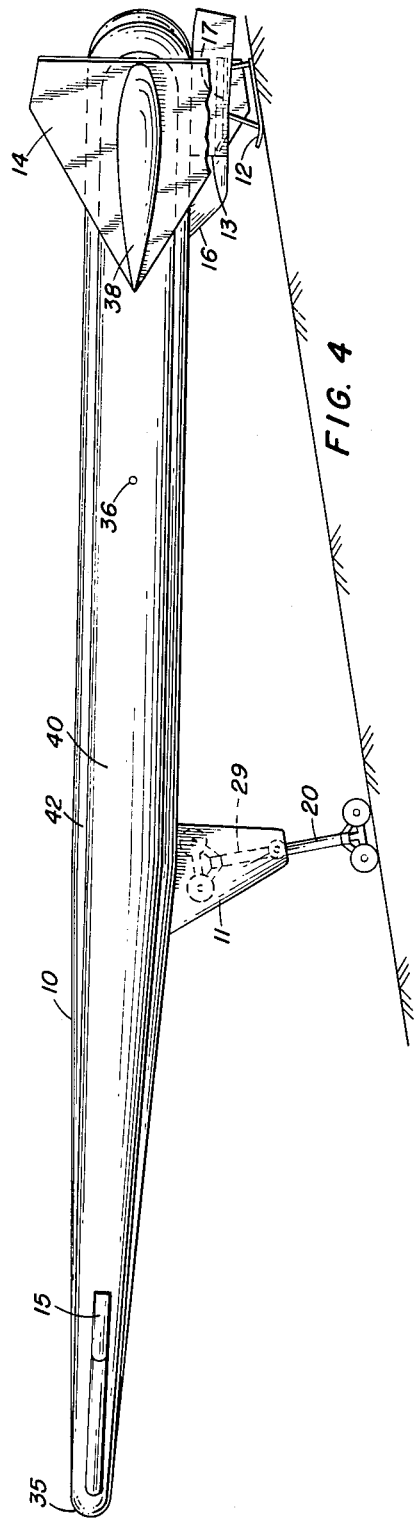
FIG. 4 is a side view of the invention as illustrated in FIG. 1.
Figure 2:
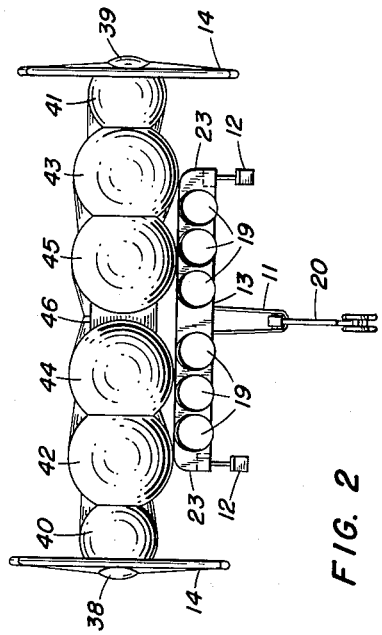
FIG. 2 is a rear view of the invention as illustrated in FIG. 1.
Figure 3:
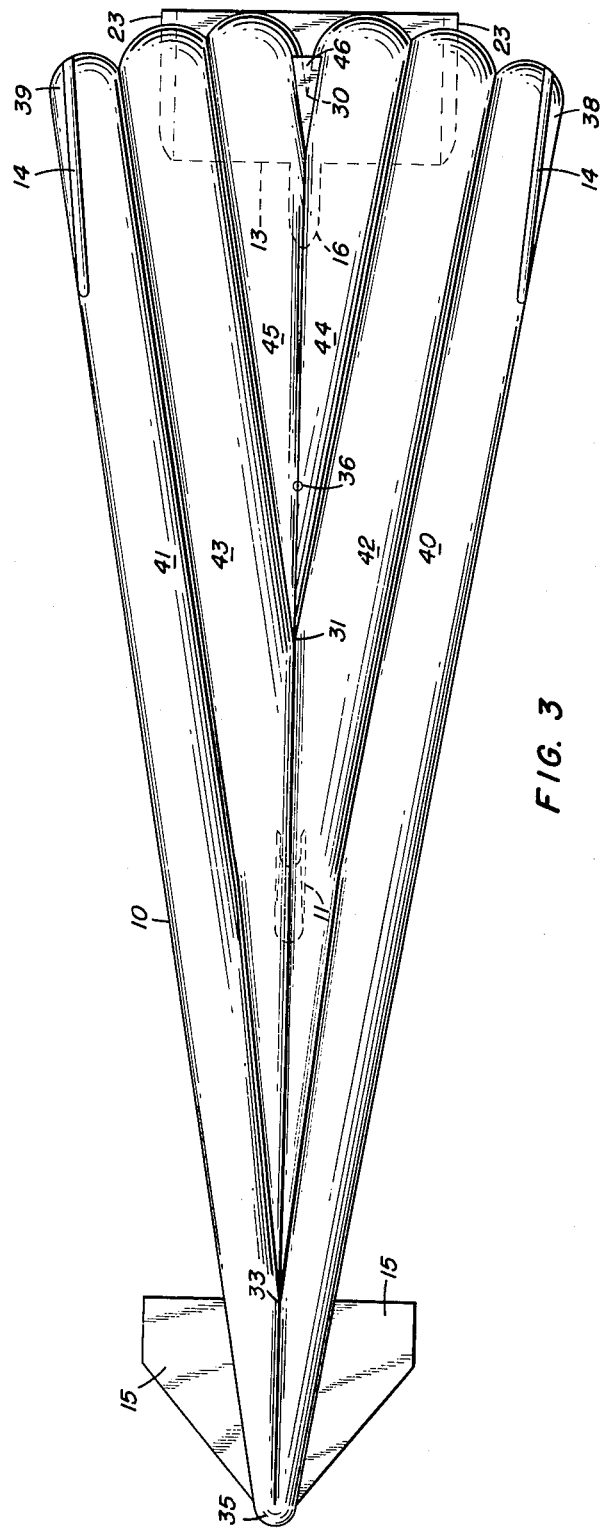
FIG. 3 is a top view of the invention as illustrated in FIG. 1.

Referring now to the drawings wherein like reference characters designate like or corresponding parts throughout the several views, there is shown in FIG. 1 an aircraft having fuselage 10, propulsion means 13, and landing means 11 and 12. The basic structural member of the aircraft is the fuselage 10. Since an efficient liquid hydrogen storage tank must be essentially a large cylinder for the purpose of reducing weight of the tank and insulation relative to the weight of the fuel stored, fuselage 10 comprises essentially a multiplicity of large cylindrical fuel tanks 40 through 45. Of course, an aircraft such as the present invention could have more cylindrical fuel tanks than merely 40 through 45 as shown in FIG. 2. As best seen in FIGS. 2, 3, and 4, cylindrical fuel tanks 40 through 45 are structurally interconnected so as to provide a rigid structural planform area. As seen in the rear view of FIG. 2, element 46, which may be considered a portion of a fuel tank, may also be employed to structurally interconnect fuel tank cylinders 44 and 45. Since liquid hydrogen is a very low density fuel a large number of these cylindrical fuel tanks are required thus providing a relatively large fuselage planform area which is consistent with the low wing loading desired. It is generally considered that the wing loading presently required of an aircraft capable of flying into orbit would be approximately fifteen (15) pounds per square foot. From the top elevation of the aircraft as seen in FIG. 3 the cylindrical fuel tanks 40 through 45 converge to a blunt radial nose 35. It should be understood that the fuselage 10 will be suitably compartmented to prevent undue movement of fuel during flight. Of course, the more dense liquid oxygen will be compartmented relatively close to the center of gravity 36. The outer cylinder tanks 40 and 41 converge at point 33 while tanks 42 and 43, 44 and 45 converge at points 31 and 30, respectively. The most satisfactory metals for use as the fuselage are molybdenum, Inconel, Rene 41, or various high temperature steel alloys.

A cunard 15 and stabilizers 14 are provided as aerodynamic control surfaces fore and aft, respectively, for the control of the aircraft while in the sensible atmosphere. The cunard 15 and stabilizers 14 may be instrumented in manners well known in the art to control pitch, attitude, and roll. These aerodynamic surfaces would, of course, be supplemented by rocket control jets for control of the aircraft when outside the earth's atmosphere in the manner presently known in the art. Additionally, the nozzles 19 of the propulsion means 13 are instrumented so as to be capable of swivel type action thereby offering additional control surfaces for the control of the aircraft. Cylindrical fuel tank portions 38 and 39 are those portions, respectively, of cylindrical fuel tanks 40 and 41 which are intersected by the stabilizers 14.

The forward landing gear employs the use of a pylon 11 into which the landing wheels and associated structures 20 swivel as shown by the dashed lines 29 in FIGS. 2 and 4, when the aircraft is in flight. The pylon has particular advantage in high speed aircraft in that during landing periods the forward portion of the aircraft is generally elevated while the rear portion generally communicates with the runway first. Upon communication of the runway with the rear landing surfaces the aircraft normally pitches down on its forward landing gear causing a large bending moment in the aircraft fuselage. Thus a pylon 11 has the advantage of extending the length of the forward landing gear so that the downward momentum of the forward portions of the aircraft will not attain sufficient proportions so as to damage the fuselage but will contact the runway early in its downward movement. It should be understood, however, that the forward landing gear could obviously be instrumented so as to retract into the fuselage. The rear landing means may be a pair of retractable skids 12 which retract into area 23, as shown by the broken lines at 17 in FIG. 4, when the aircraft is in flight or a plurality of rotatable means the requirement of which would be to offer mobility to the aircraft. The pilot's compartment 16, clearly illustrated in FIGS. 1 and 4, is placed beneath the rear portion of the aircraft and its forward portion extends forward of the propulsion means 13. The rear portion of the pilot's compartment 16 extends into the propulsion means section 13.

Propulsion requirements for an aircraft capable of satellite operation are, of course, severe. One approach would be to install a variety of power plants, each operating over a certain portion of the flight, but a single power plant which would operate efficiently over the whole range of flight would be a better approach. For this purpose propulsion means 13 comprises a letterbox design of a plurality of engines which are of a modified hybrid liquid air cycle type. That is, such an engine would have three basic modes of operation: first, at low speeds the engine would operate as a liquid air cycle unit; second, at intermediate speeds, the engine would operate as a ramjet; and third, at extreme speeds and altitudes, the engine would operate as a conventional rocket, using an oxidizer carried aboard the aircraft. The fuel for operation of the engines would in all cases be liquid hydrogen and, of course, liquid oxygen could be employed for mixture therewith at altitudes requiring rocket propulsion. The engine construction per se of the modified hybrid liquid air cycle engine is not a part of the immediate invention except in its use in combination with the airframe for obtaining the results of placing the aircraft into orbit.

Figure 5:
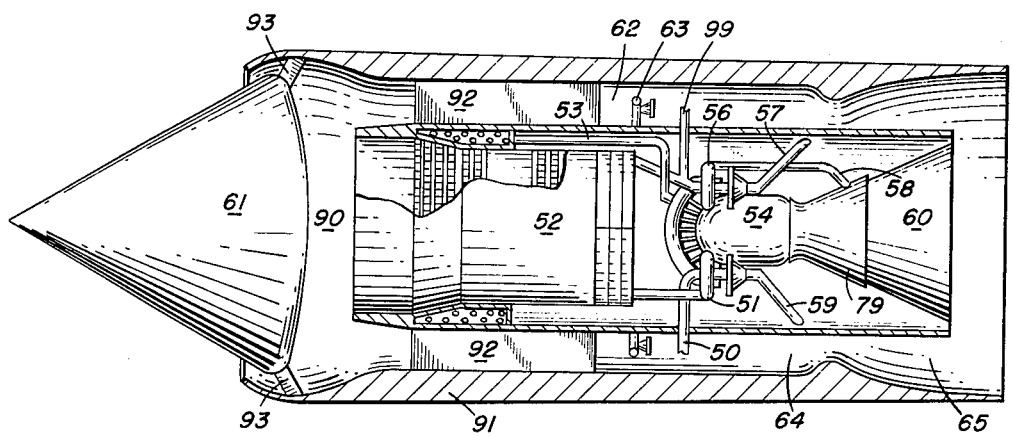
FIG. 5 is a schematic side elevation of a power plant which may be employed in the invention.

Basically an engine of the type employed in the letterbox propulsion system 13 is illustrated in FIG. 5 and may employ a diffusion means 61 held in the entry of the engine by supports 93. The liquid air cycle portion and operation of the engine comprises a hydrogen turbopump 51 which receives the hydrogen fuel through line 50 from the cylindrical fuel container fuselage 10 and which has a turbopump exhaust 59. The hydrogen fuel is pumped to the heat exchanger 52 wherein the air which enters into the engine is cooled by the passage of the hydrogen fuel through various means therein. The hydrogen fuel is thereby increased in temperature and returns through tube 53 to the combustion chamber 54. The air in the heat exchanger is cooled by passage of the liquid hydrogen therethrough and is condensed out at the rearward section of the heat exchanger and pumped by a liquid air turbopump 56 to the combustion chamber 54 for ignition therein. Turbopump 56 has a turbo exhaust 57 and a connection 58 to a cooling sleeve 79.

When sufficient speeds have been reached to satisfy operation for the ramjet portion of the engine the liquid air cycle portion 90 of the engine is cut off and the hydrogen fuel is pumped to a plurality of ramjet fuel injectors 63 spaced radially about the external portion of the liquid air cycle engine and internally of the outer member 91 of the engine. The air entering about the diffuser is compressed in the compression chamber 62 before coming into contact with the injected fuel and being ignited in the ramjet combustor chamber 64. After combustion in the ramjet combustion chamber 64 the expanded gases exhaust to the ramjet exhaust nozzle 65. The liquid air cycle portion 90 is supported internally of the ramjet housing 91 by spaced radial vanes 92.

The third mode of engine operation is accomplished by a turbopump 56 for pumping an oxidizer from supply line 99 into the combustion chamber 54. This oxygen then mixes with the hydrogen fuel pumped into the combustion chamber by the liquid hydrogen turbopump 51 for combustion and exhaust through the exhaust nozzle 60. In this manner a high degree of thrust is developed by each engine of the propulsion means 13 over three basic modes of operations used at various portions along the flight into orbit.

The instant invention offers an aircraft with low wing loading and high thrust capabilities thereby enabling sustained flight through a flight corridor into orbit.

In operation the aircraft would take off as a conventional aircraft with the engines operating as liquid air cycle engines. The aircraft would then climb and accelerate to ramjet take-over speed. At this point, the engines would be switched to ramjet operation and the aircraft would continue to climb and accelerate. When sufficient air would be no longer available because of the extreme heights and altitudes to which the aircraft had reached, the engines would be switched to conventional rocket operation, using the oxidizer carried aboard the vehicle. With high thrust and low wing loading the aircraft would eventually reach orbiting speeds and altitudes and thereafter continue to orbit as long as desired, using rocket thrust as required, to overcome the very low drag involved. In returning to earth from orbit the process of engine operation for achieving orbital flight would be reversed. It would, of course, be desirable and advantageous for the aircraft during its descent to take all advantages of glide decelerations which are practical. Thus the aircraft returning from orbit would make a conventional landing at a conventional type landing field.

It should be understood that the various cutoffs leading to and from the turbopumps 51 and 56, while not shown, could be instrumented in any of a number of methods well known in the art. Further pilot escape in case of serious malfunction could be achieved upwardly through a shaft in the fuselage 11 as well as downwardly in the manner presently employed for pilot escape.

It should be further understood that in the instant invention because of the large thrust potential of this operation, the aircraft could take off vertically, if desired, and, of course could also land vertically.

The flight of the instant invention from a conventional runway and into orbit is based on numerous theories of flight. Thorough consideration and compromise will be required of such flight considerations as velocity, altitude, range, and take-off and landing speeds. The same is true of the pay load, flying qualities, gross weight, and structural temperatures which are characteristic of the aircraft. A change in any one of the parameters will affect the remainder thereof in some manner.

The parameter of fundamental importance is the lift-drag ratio of the aircraft. With an increase in the lift-drag ratio an increased weight can be carried at the same velocity with the original power plant, or an aircraft can increase its altitude if the weight and thrust are held constant. Further, with an increased lift-drag ratio increased speed may be accomplished with the same thrust level if the weight and altitude are held constant, or for a particular cruise speed the altitude and range can be increased. Therefore, an increase in the lift-drag ratio offers the important features that either the altitude, velocity, range or weight may be increased. Of course, by compromising, all of them can be increased to a smaller degree.

One obvious way to increase the lift-drag ratio is to minimize the drag. The total aircraft drag is given by:

$$C_D = C_{D0} + C_{Di}$$

and $$C_{D0} = C_{DF} + C_{Df} + C_{Dw}$$

where $C_D$ is the total drag coefficient $C_{D0}$ is minimum drag at zero lift and $C_{Di}$ is the induced drag or drag due to lift. Further, in the above, $C_{Dw}$ is the wave drag, $C_{DF}$ is the form of discontinuity drag and $C_{Df}$ is the form or skin friction drag.

The form plus skin friction drag levels of an aircraft cannot be appreciably improved upon except by such devices as the use of boundary layer control to provide laminar flow. A similar result may, however, be accomplished by effecting flow transition through the control of the vehicle skin-to-boundary layer temperature ratio. The wave drag is ordinarily kept at a minimum through the use of the most optimum aerodynamic shapes which are compatible with the other aircraft characteristics. The importance of a low skin friction coefficient lies in the fact that the lift-drag ratio improves at an increasing rate with a decrease in the coefficient of skin friction.

Of course, the lift requirements of a particular aircraft are dependent upon the altitude of flight as well as the aircraft's velocity. Flight at high velocities increases the centrifugal force to a considerable proportion of the aircraft's weight. Thus a large part of the weight of an aircraft may be supported by centrifugal force leaving the remainder to be supported by aerodynamic lifting means. This, of course, reduces the lift coefficient required since:

$$C_L = W_A \frac{W}{S} \frac{1}{q}$$

where $C_L$ is the lift coefficient, $W_A$ is the percentage of aircraft weight to be supported by aerodynamic lift, $W$ is the gross weight of the aircraft, $S$ is the representative surface lift area, and $q$ is the dynamic pressure.

At the maximum altitude for sustained flight the weight of an aircraft must be supported by the combined centrifugal and aerodynamic forces. Thus the weight $W$ of the aircraft will be equal to the centrifugal force plus the aerodynamic lift. With the cruise lift coefficient of the aircraft being determined by the aerodynamic characteristics of the aircraft the altitude for cruise is dependent only upon the velocity and aircraft wing loading. It is apparent, therefore, that with a coefficient of lift determined by the aerodynamic characteristics of the aircraft, increased altitudes are possible with wing loadings in the lower ranges.

Temperature limitations are also important criterions in the performance of high speed aircraft and may severely curtail the performance thereof by aerodynamic heating at high Mach numbers. The maximum temperature which may be reached by an uncooled vehicle is its equilibrium temperature which means that all heat inputs into the aircraft are balanced by thermal radiation away from its surface. The equilibrium temperature may, however, never be reached on any particular flight since a considerable time is required for the various modes of heat transfer to come into equilibrium.

Generally, however, because of the decreasing density of atmosphere with altitude very high Mach numbers are permissible at these higher altitudes. While the effect of decreasing density of the atmosphere with altitude may be advantageously exploited with relative ease by aerodynamically efficient aircraft an altitude limit is placed on the flight regime of the aircraft by its maximum lift capability. The maximum lift of the aircraft dictates the highest altitude at which the aircraft can maintain a sustained flight at any given Mach number. Therefore, the allowable flight regime for an aircraft must be in the area of a sufficient Mach number velocity at a particular altitude which is at or below its maximum lift and below its equilibrium temperature. Out of this area, the aircraft will either exceed the temperature limit, as in areas 82 and 83 of FIG. 6, or fail to develop the lift necessary to support itself as in area 80 of FIG. 6.

Significant increases in allowable Mach number may be possible by the use of materials which have high surface emissivities. The use of this type of a surface increases thermal radiation from the aircraft surfaces at a given temperature thus increasing the allowable aerodynamic heating rate. Such an improvement can be easily utilized, since high surface emissivities can be obtained with little difficulty.

The effects of leading edge radius and sweepback angles on stagnation point equilibrium temperatures for flight conditions are important. While considerable decrease in temperatures is possible if larger leading edge radii are incorporated, this effect becomes less pronounced as the radius increases to large values. Therefore, some optimum compromise between aerodynamic, structural, and thermal considerations are required for each aircraft. Considerable reductions in stagnation point equilibrium temperatures are possible if the leading edge is swept back. The effect, however, is small until high sweepback angles are attained.

Figure 6:
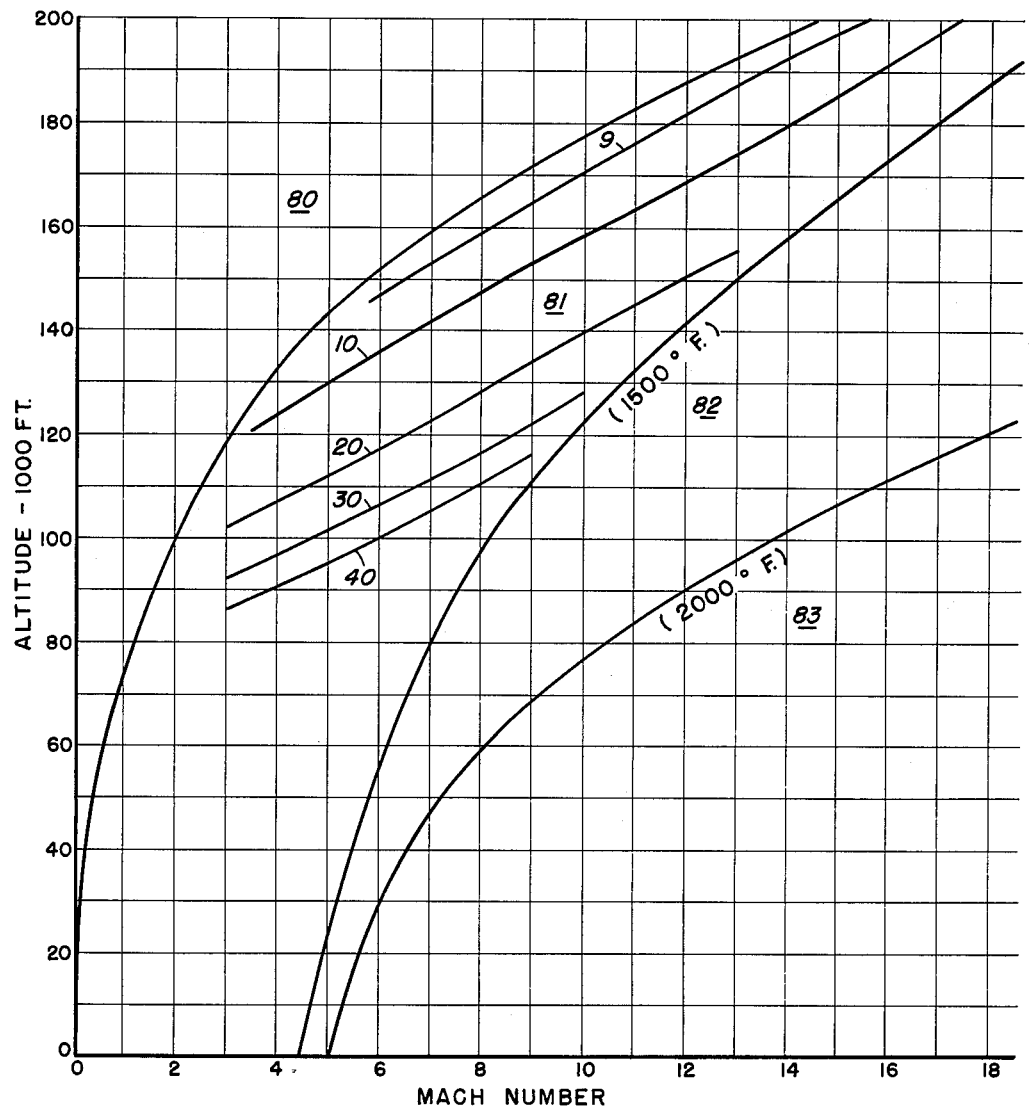
FIG. 6 is a graph showing a flight corridor extending to orbital velocity and altitude.

The flight corridor for sustained flight is shown at 81 on FIG. 6 and takes into consideration a surface emissivity of approximately $\epsilon=0.8$ which is reasonable for an aircraft configured for maximum range. This emissivity and the selection of a practical maximum structural temperature of approximately 1500° F. determines the outermost Mach boundary. For each position along this limit the vehicle configuration is assumed to be optimum in that the wing and the body combination utilize interference lift to gain the highest lift-drag ratio. The next temperature limiting curve shows the gain in speed possible, as shown by area 82, if the temperature could be increased by 500° F. if higher temperature materials were accomplished. Area 83 under the 2000° F. curve indicates the limitation on speed without even further achievement of high temperature materials.

A most important parameter in vehicle design, the wing loading $W/S$, determines the height of the flight regime. The curves 9, 10, 20, 30, and 40 illustrate the altitude possible at a specified velocity for an aircraft having a wing loading of 9, 10, 20, 30, or 40 pounds per square foot. It can be seen, therefore, that as the wing loading decreases from 40 to 10 pounds per square foot, the altitude increases rapidly.

The instant invention having a wing loading of approximately 15 pounds per square foot and employing a propulsion means capable of high thrust through the various modes of operation such as liquid air cycle, ramjet, and rocket operation takes advantage of the preceding theories of operation and characteristics of flight required to fly into orbit. It should be understood that a wide variety of possibilities exists for arranging the various components of the instant invention such as the fuselage, propulsion means, pilot compartment, controlled surfaces, and landing gears.

Obviously, many modifications and variations of the present invention are possible in light of the above teachings. It is, therefore, to be understood that within the scope of the appended claims the invention may be practiced otherwise than is specifically described.

What is desired to be secured by Letters Patent of the United States is:

1. An aircraft capable of satellite operation comprising
 a plurality of interconnected fuel containers forming the aerodynamic fuselage of said aircraft;
 forward aerodynamic control means for controlling said aircraft in the earth's atmosphere;
 rear aerodynamic control means for also controlling said aircraft in the earth's atmosphere;
 a pilot's cockpit placed beneath and to the rear of said interconnected fuel containers;
 propulsion means placed beneath said fuel containers and behind said pilot's cockpit having a plurality of engines in letterbox bank for propelling said aircraft from earth into orbit and back to earth;
 each engine of said plurality of engines comprising
 a first combustion chamber,
 a heat exchanger,
 a liquid hydrogen fuel pump for pumping fuel through said heat exchanger thereby increasing the temperature of said hydrogen fuel while condensing air into liquid air in said heat exchanger and for pumping said heated fuel into said first combustion chamber;
 a liquid air pump for pumping said liquid air to said first combustion chamber for combustion with said hydrogen fuel;
 a first exhaust nozzle whereby said engines operate as liquid air cycle engines during low altitude flights;
 means for controlling the aircraft at altitudes beyond the earth's atmosphere; and
 means for mobile support during take-off and landing whereby the aircraft employs a conventional runway for take-off, flies into orbit, and returns to the runway for a conventional landing.

2. An aircraft capable of satellite operation comprising
 a plurality of interconnected fuel containers forming the aerodynamic fuselage of said aircraft;
 forward aerodynamic control means for controlling said aircraft in the earth's atmosphere;
 rear aerodynamic control means for also controlling the aircraft in the earth's atmosphere;
 a pilot's cockpit placed beneath and to the rear of said interconnected fuel containers;
 propulsion means placed beneath said fuel containers and behind said pilot's cockpit having a plurality of engines in letterbox bank for propelling the aircraft from earth into orbit and back to earth, each engine of said plurality of engines comprising
 a combustion chamber,
 hydrogen fuel injection means for fuel injection into said combustion chamber,
 an air inlet,
 an air compression chamber for compression of said incoming air immediately preceding its passage into said combustion chamber for combustion therein;
 an exhaust nozzle whereby said engines operate as ramjet engines during that portion of the flight into orbit which requires ramjet propulsion for most efficient flight;
 means for controlling the aircraft at altitudes beyond the earth's atmosphere; and
 means for mobile support during take-off and landing whereby the aircraft employs a conventional runway take-off and returns to said runway for conventional landing.

3. An aircraft capable of satellite operation comprising
 a plurality of interconnected fuel storage containers forming the aerodynamic fuselage of said aircraft;
 forward aerodynamic control means for controlling said aircraft in the earth's atmosphere;
 rear aerodynamic control means for also controlling said aircraft in the earth's atmosphere;
 a pilot's cockpit disposed beneath and to the rear of said interconnected fuel storage containers;
 propulsion means disposed beneath said fuel containers and behind said pilot's cockpit having a plurality of engines in letterbox bank, and engine of said plurality of engines comprising
 a combustion chamber,
 an exhaust nozzle,
 a liquid hydrogen fuel pump for pumping heated fuel into said combustion chamber;
 a liquid air pump for pumping liquid oxygen from said fuel storage containers into said combustion chamber for conmbustion with hydrogen fuel therein whereupon the expanded gases exhausted through said exhaust nozzle and said engines operate as rocket engines at altitudes above those satisfactory for ramjet operation.

References Cited by the Examiner

UNITED STATES PATENTS

| | | | |
|---|---|---|---|
| 2,877,966 | 3/1959 | Summers | 60—35.6 |
| 2,952,122 | 9/1960 | Fox | 60—35.6 |
| 2,967,034 | 1/1961 | Eyre | 244—119 |
| 2,982,496 | 5/1961 | Creasey et al. | 244—45 X |

OTHER REFERENCES

"Rocketry" by Constantin Paul Lent, 1947; Pen-Ink Publishing Co., pages 85–93 and 147.

MILTON BUCHLER, *Primary Examiner.*

SAMUEL BOYD, SAMUEL FEINBERG, *Examiners.*

R. F. STAHL, L. C. HALL, *Assistant Examiners.*